United States Patent [19]

Kashiwa et al.

[11] Patent Number: 4,628,363
[45] Date of Patent: Dec. 9, 1986

[54] CHROMA-KEY TRACKING APPARATUS

[75] Inventors: Masahiro Kashiwa; Masashi Onosato; Hiroshi Takahashi, all of Tokyo, Japan

[73] Assignee: NEC Corporation, Japan

[21] Appl. No.: 553,753

[22] Filed: Nov. 21, 1983

[30] Foreign Application Priority Data

Nov. 19, 1982 [JP] Japan .................................. 57-203170

[51] Int. Cl.⁴ .......................... H04N 5/275; H04N 9/74
[52] U.S. Cl. ...................................... 358/183; 358/22; 358/177
[58] Field of Search ...................... 358/183, 22, 30, 36, 358/155, 167, 177, 178

[56] References Cited

U.S. PATENT DOCUMENTS

| | | | |
|---|---|---|---|
| 3,624,290 | 11/1971 | Hofmann | 358/177 |
| 4,163,992 | 8/1979 | Inaba | 358/183 |
| 4,200,890 | 4/1980 | Inaba | 358/183 |
| 4,488,169 | 12/1984 | Yamamoto | 358/22 |
| 4,520,398 | 5/1985 | Takahashi | 358/22 |

Primary Examiner—Tommy P. Chin
Attorney, Agent, or Firm—Ostrolenk, Faber, Gerb & Soffen

[57] ABSTRACT

A chroma-key tracking apparatus capable of automatically eliminating an unwanted partial spot noise from a chroma-key signal, to enable the generation of a correct frame around a desired portion of a television picture. The apparatus includes a noise eliminating circuit which by use of counters and comparators is capable of eliminating partial spot noises whose size in the horizontal and vertical directions is smaller than a predetermined value.

9 Claims, 8 Drawing Figures

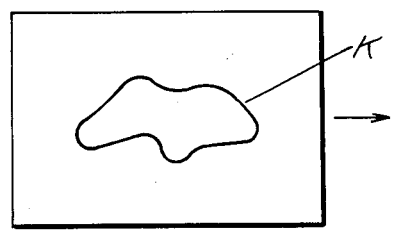
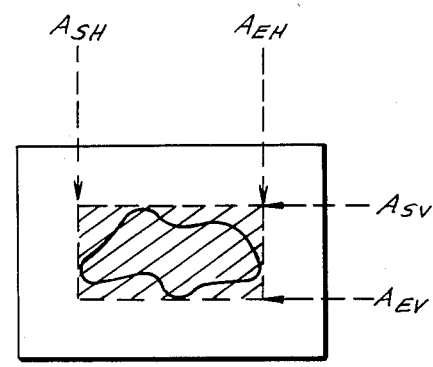
FIG.1a.   FIG.1b.
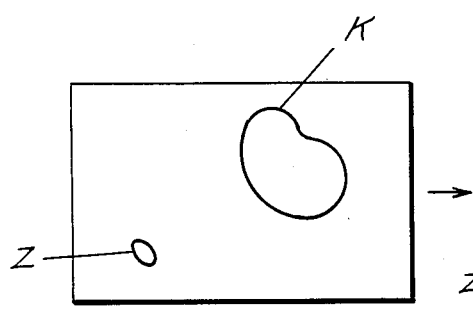
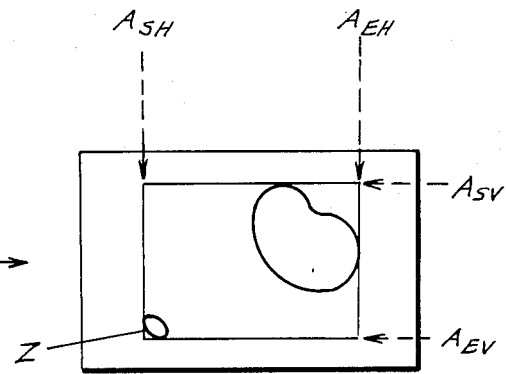
FIG.2a.   FIG.2b.

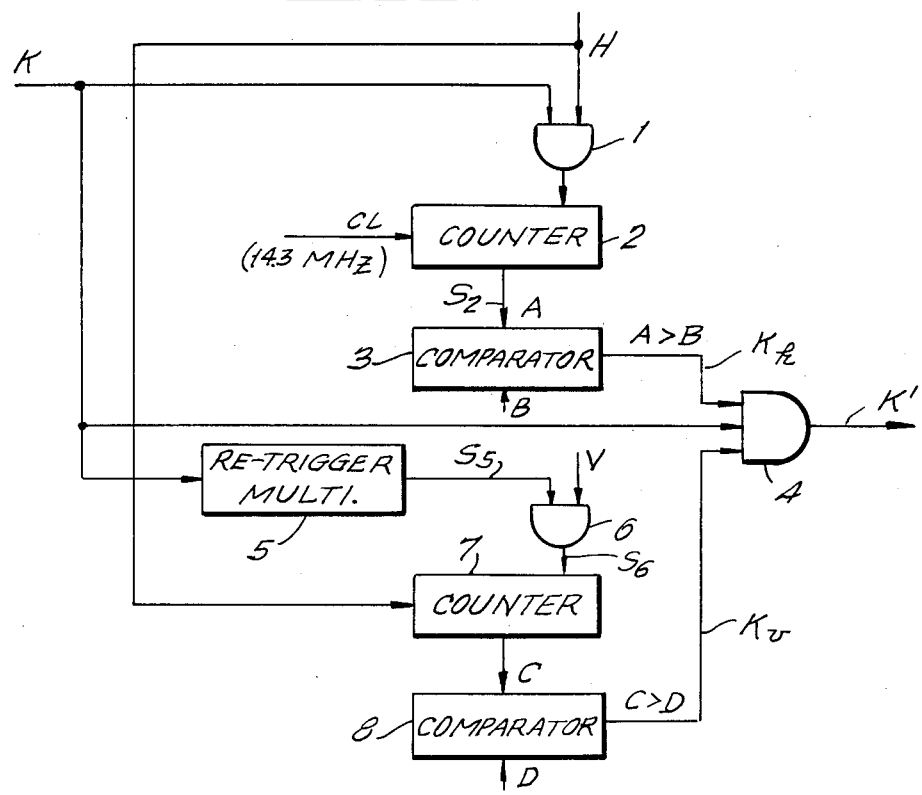
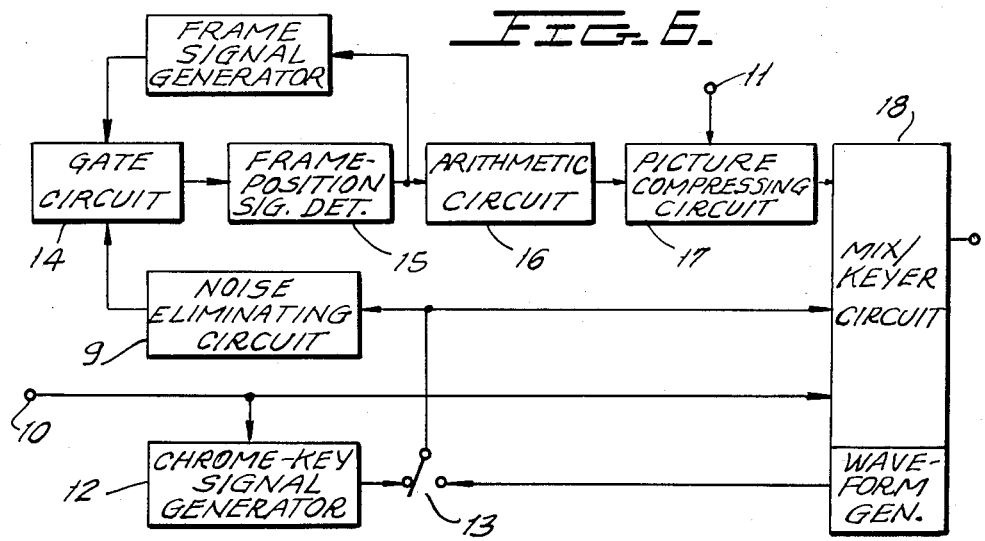

CHROMA-KEY TRACKING APPARATUS

BACKGROUND OF THE INVENTION

This invention relates to a chroma-key tracking apparatus.

A chroma-key tracking apparatus is used to produce a special effect by compressing a television picture to a small size corresponding to a chroma-key frame, and inserting the compressed television picture into another television picture. An apparatus of this kind is disclosed in U.S. Pat. No. 4,200,890. In the apparatus disclosed in this patent, a frame position signal representing the frame size to which the television picture is compressed is generated based on a chroma-key signal, and a picture compressing circuit compresses a television picture in response to this frame position signal, or to a frame position signal which is a little larger. The compressed television picture is supplied to a mix-keyer circuit, and combined with another television picture in response to the chroma-key signal.

In the disclosed apparatus, minimum and maximum positions in the horizontal and vertical directions with respect to the chroma-key signal are detected for generating the frame position signal in such a manner as shown in FIG. 4. This method can be practiced by a comparatively simple circuit construction. However, when an unwanted partial spot noise is included in the chroma-key key signal, a chroma-key frame which includes this partial noise spot is inevitably generated. When such an erroneous detection occurs, the television picture is not compressed to the size that corresponds to the desired size represented by the chroma-key signal in the picture compressing circuit, so that the desired special effect is not obtained. When the key signal, especially the chroma-key signal, is generated by discriminating a hue difference, the partial spot noise is likely to occur in certain television pictures. Furthermore, the partial spot noise also occurs intermittently, so that the stable chroma-key tracking operation can not be performed.

SUMMARY OF THE INVENTION

Therefore, it is an object of the present invention to provide a chroma-key tracking apparatus capable of automatically eliminating an unwanted partial spot noise from a chroma-key signal, thereby enabling the correct detection of the frame position.

According to the present invention, a chroma-key tracking apparatus including a noise eliminating circuit cab be obtained, the noise eliminating circuit being adapted to eliminate a partial spot noise by counting the width of the partial spot noise contained in an chroma-key signal in the horizontal and vertical directions, and masking the partial spot noise whose width is less than a predetermined width.

BRIEF DESCRIPTION OF THE DRAWING

FIGS. 1(a) and 1(b) show a shape of a chroma-key signal on a television screen and a frame position corresponding to the chroma-key signal, respectively;

FIGS. 2(a) and 2(b) show another shape of a chroma-key signal including a partial spot noise and a corresponding frame position, respectively, for explaining the operation of a prior art frame position detection;

FIG. 3 is a block diagram of a noise eliminating circuit according to the present invention;

FIG. 6 shows a block diagram of a chroma-key tracking apparatus including the noise eliminating circuit according to the present invention.

DESCRIPTION OF THE PREFERRED EMBODIMENT

First, the detection of a frame position in a chroma-key signal will be described. Assuming the chroma-key signal K shown in FIG. 1(a) within a television picture, the frame shown in FIG. 1(b), which surrounds the chroma-key signal K, is detected. In a prior art frame position detection step, a minimum position (start position) $A_{SH}$ and a maximum position (end position) $A_{EH}$ in the horizontal direction are detected. Further, a minimum position $A_{SV}$ and a maximum position $A_{EV}$ in the vertical direction are also detected. However, when unwanted noise, i.e., a partial spot noise Z is included in the chroma-key signal K, as shown in FIG. 2(a), a frame which includes the partial spot noise Z is unavoidably generated in the prior art at shown in FIG. 2(b). Consequently, a compressed television picture having only desired portion can not be obtained and the desired special effect is not generated.

Next, a noise eliminating circuit according to the present invention will now be described with reference to FIG. 3. The elimination of noise in the horizontal direction will be described. The chroma-key signal K is applied to an AND-gate 1 in which the chroma-key signal is processed with a pulse H representating a horizontal scanning period. The output delivered from the AND-gate 1 is applied to a counter 2 and while this output is supplied, for example when this output is at high level, a clock pulse CL having a frequency sufficiently higher than the horizontal scanning frequency, for example, 14.3 MHz is counted. When the output delivered from the AND-gate 1 to the counter 2 turns to low level, the count is reset. The counted value A delivered from the counter 2 is sent to a comparator 3 in which the value A is compared with a predetermined mask width B corresponding to the width of a partial spot noise to be eliminated, for example, "3". When the result of the comparison is $A > B$, a horizontal key signal $K_h$ is sent to an AND-gate 4. Because of the provision of the comparator 3, any partial spot noise having the width less than the mask width B is eliminated.

Figure 4:
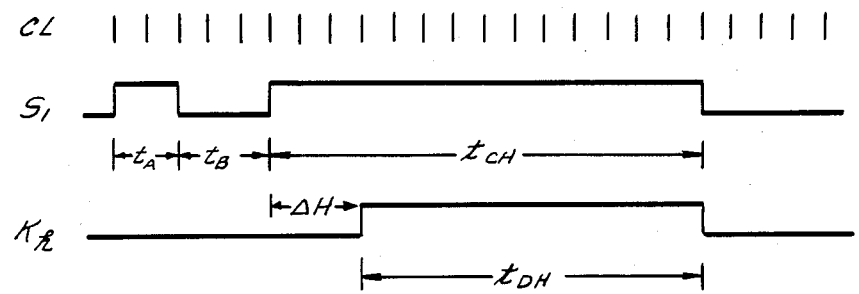
FIG. 4 shows the operation of the noise eliminating circuit shown in FIG. 3 with respect to the horizontal direction.

In FIG. 4 showing the operation for eliminating the partial noise spot in the horizontal direction, the partial spot noise having the width $t_A$, i.e., "2" is eliminated. After the counter 2 is reset in a next period $t_B$, it starts to count again in a period $t_{CH}$. When the count value in the counter 2 exceeds "3", the key signal $K_h$ is delivered from the comparator 3. The width $t_{DH}$ of the key signal $K_h$ is less than that of the period $t_{CH}$ by a period $\Delta H$, i.e., "3". However, the period $\Delta H$ is compensated for very easily when the frame detection operation is carried out by a chroma-key tracking apparatus.

Figure 5:
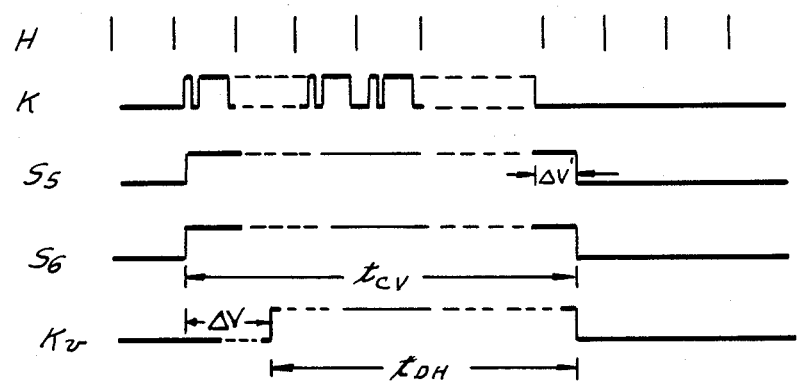
FIG. 5 shows the operation of the noise eliminating circuit shown in FIG. 3 with respect to the vertical direction.

The elimination of partial spot noise in the vertical direction will now be described with reference to FIGS. 3 and 5. The chroma-key signal K is first sent to a retriggerable multivibrator 5 where the chroma-key signal is converted into a continuous key signal $S_5$ of high level, including a horizontal blanking period. To this end, the retriggering period in the retrigger multivibrator is set to a period between one horizontal period and two horizontal periods, for example, 100 µs. The continuous key signal $S_5$ from the retrigger multivibrator 5 is sent to an AND-gate 6 with a vertical pulse V representing the vertical scanning period. The output $S_6$ delivered from the AND-gate 6 is sent to a counter 7. When the level of this output $S_6$ is high, the counter 7 counts up using a horizontal pulse H as a clock pulse. The counter 7 is reset when the level of the output $S_6$ from the AND-gate 6 falls to low level, in the same manner as the counter 2. The counter value C delivered from the counter 7 is compared, by a comparator 8, with a mask width D corresponding to a vertical width of the partial spot noise to be eliminated. When $C>D$, a vertical key signal $K_v$ is delivered from the comparator 8 and applied to the AND-gate 4. As may be clearly seen from FIG. 5, the width of the vertical key signal $K_v$ is less than that of the key signal K by the period $\Delta V$ corresponding to the mask width. The width of this period $\Delta V$ is also compensated for easily by the chroma-key tracking apparatus. Since the retriggerable multivibrator 5 is used, a trailing end of the continuous key signal $S_5$ extends beyond that of the key signal K by $\Delta V'$, which is extremely short, and can be neglected. The horizontal key signal $K_h$, the vertical key signal $K_v$, and the input chroma-key signal K are supplied to the AND-gate 4, so that a noise-eliminated key signal K' can be obtained from the AND-gate 4.

In FIG. 6 showing the chroma-key tracking apparatus including the noise eliminating circuit 9 according to the present invention, two video signals are supplied to terminals 10 and 11, and a chroma-key signal generator 12 generates a chroma-key signal by discriminating a predetermined hue within the video signal from the terminal 10. This chroma-key signal is sent to a position signal detector 15 through the noise eliminating circuit 9 and a gate circuit 14, and the frame position corresponding to the chroma-key signal is detected thereby. The frame position signal delivered from the detector 15 is sent to an arithmetic circuit 16 in which the shortages $\Delta H$ and $\Delta V$ generated in the noise eliminating circuit 9 are compensated, and in which the frame position signal is enlarged by a predetermined width and applied to a picture compressing circuit 17. In the picture compressing circuit 17, the video signal delivered from the terminal 11 is compressed to the size of the frame. The compressed video signal is sent to a mix/keyer circuit 18. In the mix/keyer circuit 18, the compressed television picture is inserted into the television picture from the terminal 10 in accordance with the chroma-key signal K to form the special effect. Since the detailed operations of these parts are described in the specification of U.S. Pat. No. 4,200,890, detailed descriptions thereof are omitted here.

According to the present invention described above, any partial spot noise contained in the input chroma-key signal is eliminated so that the accurate frame position of the chroma-key signal can be detected, and thereby the desired special effect can be performed reliably.

What is claimed is:

1. A tracking apparatus for inserting a first television picture into a part of a second television picture to obtain a special effect, comprising:
    means responsive to a second television signal which is indicative to said second television picture for generating a key signal which represents an area of a television frame of said second television picture which is occupied by said first television picture;
    noise eliminating means for removing from said key signal a picture noise component having a dimensional width which is less than a predetermined dimensional width value, said noise eliminating means measuring said picture noise component to determine the dimensional width thereof to produce a noise-free key signal;
    means responsive to said noise free key signal from said noise eliminating means for detecting a surrounding frame surrounding the boundary of said frame represented by said key signal;
    means responsive to said surrounding frame for producing an imaginary frame indicating a size to which a first television signal corresponding to said first television picture is to be compressed;
    means responsive to said imaginary frame for compressing said first television signal to the size of said imaginary frame; and
    means for inserting said compressed first television signal from said compression means into said second television signal corresponding to said second television picture in accordance with said key signal.

2. The tracking apparatus according to claim 1, wherein said noise eliminating means includes:
    at least one counter for counting clock pulses during a period corresponding to said key signal to determine the width of said key signal; and
    at least one comparator for comparing counted values delivered from said at least one counter to at lease one predetermined mask value to deliver said noise-free key signal from which picture noise components of a counted value are less than said at least one predetermined mask value has been removed.

3. The tracking apparatus according to claim 1, wherein said noise eliminating means comprises:
    timing means for timing the duration of each horizontal segment of said key signal;
    means coupled to said timing means for eliminating each said horizontal segment which is of a time duration of less than a first predetermined value;
    detecting and timing means for detecting segments of said key signal in the vertical direction and for timing the vertical width of said key signal; and
    means coupled to said detecting and timing means for eliminating said segments of said key signal corresponding to areas where said vertical width is of a value of less than a second predetermined value, and means for combining the non-eliminated horizontal and vertical segments of said key signal to produce said noise-free key signal.

4. The tracking apparatus according to claim 3, wherein said means responsive to said noise free key signal from said noise eliminating circuit further comprises means for compensating for reductions in the horizontal and vertical width of said noise-free key signal which is generated by said noise eliminating means and which are not attributable to said picture noise component.

5. A noise eliminating circuit for use in a tracking apparatus which is used for inserting a first television picture into part of a second television picture, said tracking apparatus being of a type in which a key signal representing active positions occupied by said first television picture is received so that a frame of said second television picture into which said first television picture may be fitted may be generated, said noise eliminating circuit comprising:

first measuring means for measuring a horizontal size of said key signal in the horizontal direction;

second measuring means for measuring a vertical size of said key signal in the vertical direction;

means for setting a predetermined horizontal mask value;

means for setting a predetermined vertical mask value;

first comparing means for comparing said horizontal size measured by said first measuring means with said predetermined horizontal mask value to produce a horizontal noise detection signal when said horizontal size is smaller than said predetermined horizontal mask value;

second comparing means for comparing said vertical size measured by said second measuring means with said predetermined vertical mask value to produce a vertical noise detection signal when said vertical size is smaller than said predetermined vertical mask value; and means responsive to said horizontal noise detection signal and said vertical noise detection signal for inhibiting said key signal to form a noise-free key signal.

6. The nose eliminating circuit as in claim 5, wherein said first measuring means comprises a counter for counting a clock pulse having a frequency higher than a horizontal scanning frequency, said counter being enabled by said key signal and being reset when said key signal is not present.

7. A noise eliminating circuit as in claim 5, wherein said second measuring means comprise a retriggerable multi-vibrator responsive to said key signal for delivering a retriggered key signal, said retriggerable multi-vibrator having a retrigger period longer than said horizontal scanning period; and a counter for counting a clock pulse synchronized with a horizontal synchronizing frequency, said counter being enable by said retriggered key signal and being reset when said retrigger key is not present.

8. The noise eliminating circuit according to claim 5, wherein said inhibiting means includes gate means receiving said key signal, said horizontal noise detection signal and said vertical noise detection signal to form said noise-free key signal.

9. A noise eliminating circuit for use with a tracking apparatus of the type which is used for inserting a first television picture into a part of a second television picture and which includes means for generating a key signal which represents an area corresponding to the positions to be occupied by said first television picture relative to the television frame associated with said second television picture, said noise eliminating circuit comprising:

means for determining the sizes of subareas of said second television picture to which said key signal corresponds; and means for removing, from said key signal, a portion or portions of said key signal which correspond to any of said subareas of said second television picture whose vertical and horizontal dimensions are less than predetermined mask values.

* * * * *